N. H. E. CLARK.
VARIABLE SPEED TRANSMISSION GEARING.
APPLICATION FILED MAR. 15, 1917.

1,284,058.

Patented Nov. 5, 1918.
2 SHEETS—SHEET 1.

INVENTOR

N. H. E. Clark

N. H. E. CLARK.
VARIABLE SPEED TRANSMISSION GEARING.
APPLICATION FILED MAR. 15, 1917.

Patented Nov. 5, 1918
2 SHEETS—SHEET 2.

INVENTOR

UNITED STATES PATENT OFFICE.

NICHOLAS H. E. CLARK, OF OAKLAND, CALIFORNIA.

VARIABLE-SPEED-TRANSMISSION GEARING.

1,284,058.   Specification of Letters Patent.   Patented Nov. 5, 1918.

Application filed March 15, 1917.   Serial No. 155,125.

*To all whom it may concern:*

Be it known that I, NICHOLAS H. E. CLARK, a citizen of the United States, residing at Oakland, in the county of Alameda and State of California, have invented a new and useful Variable-Speed-Transmission Gearing, of which the following is a specification.

This invention relates to certain improvements in variable-speed gearing, and especially to that class of speed gearing shown and described in my co-pending application filed May 17, 1916, Serial Number 98,137; the principal difference being that in the former invention all the main line gearing rotates in the opposite direction from that of the drive shaft thereby doubling the speed contact in the bearings, whereas in the present improvement these gears travel in the same direction as the drive shaft, rotating at times with an equal speed and at other times with slightly greater speed, the difference in speed being small.

One object of the invention is to so arrange the gearing that the speed of the driven shaft may be graduated to any desired fineness and without the usual shock attendent upon the step-up type of change speed gearing.

A further object is to combine variable speed friction gears with planet reduction gearing in such a manner that the greater portion of the power is transmitted through the drive shaft and planet gears, while a lesser portion is carried by the friction surfaces thereby lessening the required pressure and area of the friction surface.

I attain these objects by the mechanism hereinafter described, and illustrated in the accompanying drawings, in which—

Figure 1:
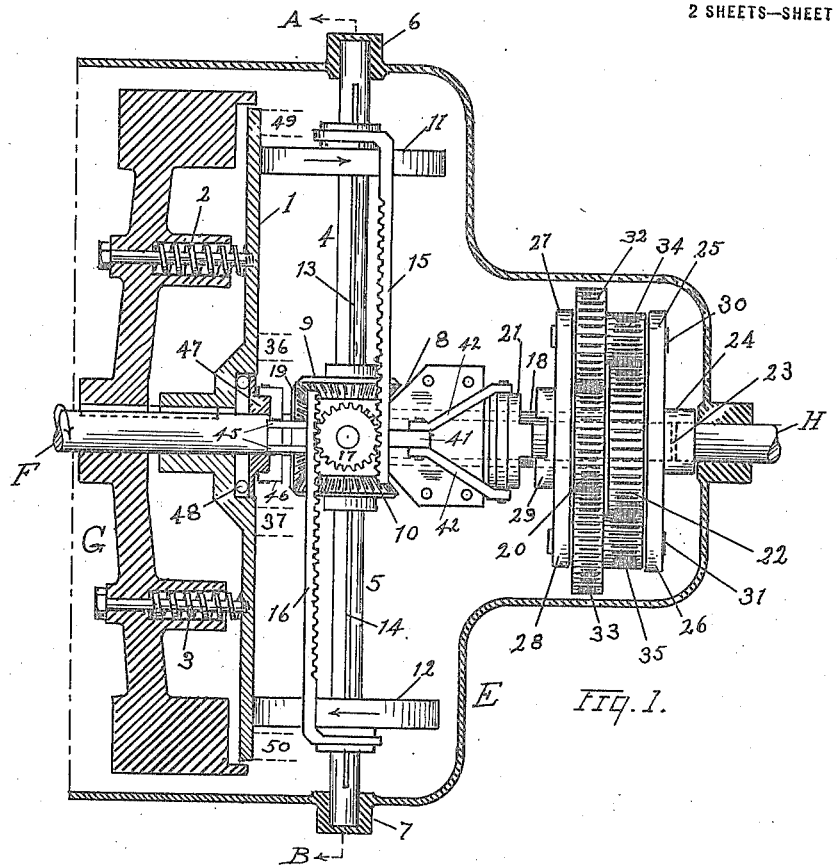
Figure 2:
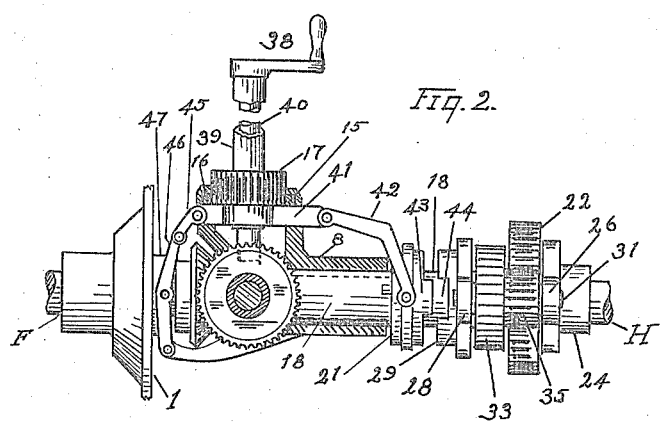
Figure 3:
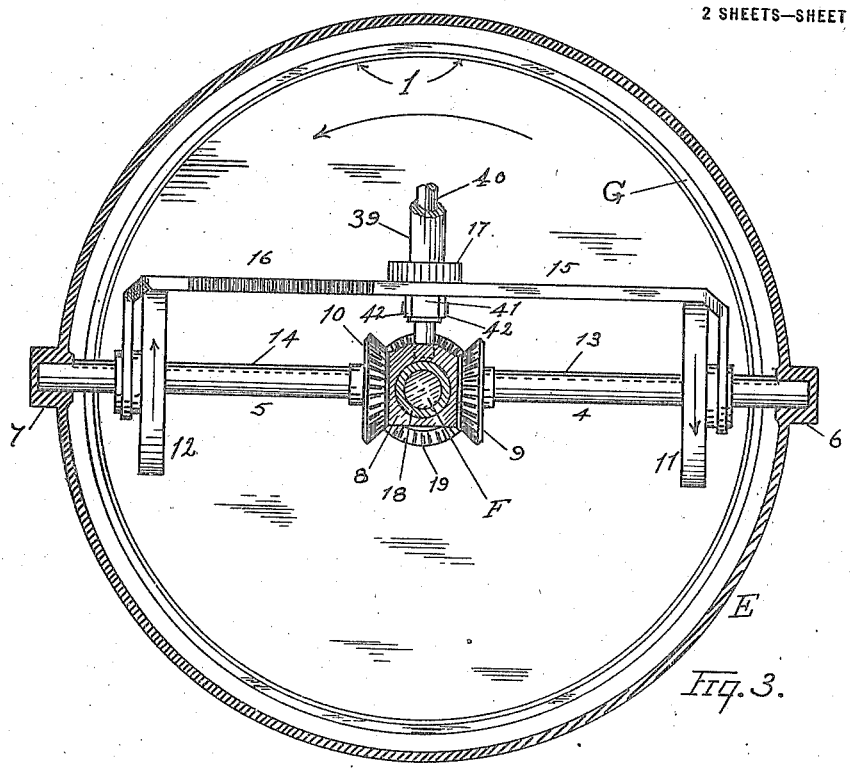
Figure 4:
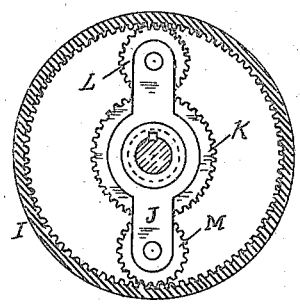

Figure 1 is a horizontal section of a transmission gear case with the working parts shown partly in section; Fig. 2 is side elevation of the central portion of Fig. 1; Fig. 3 a vertical section through A B of Fig. 1; Fig. 4 a cross section through C D of Fig. 5; and Fig. 5 a longitudinal section, both the latter figures representing a modification of the planet gearing shown in Figs. 1 and 2.

Similar characters of reference denote similar parts throughout the several views.

E denotes the gear casing which supports the bearings and brackets carrying the working parts within, F is the engine drive shaft to which is rigidly keyed the usual fly-wheel G, the friction disk 1 forming a part of the fly-wheel is slidably mounted upon the shaft and held apart from the fly-wheel by compression springs 2 and 3. Parallel to the face of the disk is mounted splined shafts 4 5 having their outer bearings in the casing at 6 7 and the inner bearings in the block 8, the gears 9 10 are keyed rigidly to the shafts and the friction wheels 11 12 slide upon and are prevented from rotating upon the shafts by the splines 13 14 set in the grooves cut in the shafts. The friction wheels are moved along the shafts by the racks 15 16 which engage the grooved hubs of the friction wheels at the outer ends and toothed pinion 17 in the center.

Upon the drive shaft F is rotatably mounted the sleeve 18 to one end of which is fixed the miter gear 19 and to the other end the gear 20, while the interlocking clutch member 21 is splined to the sleeve, the block 8 forms a bearing for the sleeve which in turn acts as a bearing for the drive shaft.

The gear 22 is keyed to the drive shaft F, the division point between which and the driven shaft H is indicated at 23, the drive shaft working loosely in the hub 24 while the driven shaft is keyed thereto. The planet arms 25 26 are cast integral with the hub 24, and a similar and opposite pair is provided at 27 28 being integral with the clutch hub 29 which works loosely upon the sleeve 18. Rotatably mounted upon the pintles 30 31 between the planet arms are the planet gears 32 33 which are cast integral with the pinions 34 35. The planet gears engage the gear 20 and the planet pinions the gear 22.

In operation: Assuming the friction wheels in the position shown in Fig. 1 and the drive shaft F rotating in the direction of the arrow, the friction wheels 11 12 will rotate as shown by their respective arrows, thus the gears 9 10 will rotate the gear 19 in the same direction as the drive shaft F, but since at the point of contact of the friction wheels the disk 1 has a diameter of three times that of the friction wheels, said wheels, through the medium of the miter gears 10 11 19 and sleeve 18 will impart a three to one motion to the gear 20 in the same direction as the drive shaft, while the gear 22 being fixed to the drive shaft will rotate at drive shaft speed. Now as the planet pinions 34 35 are one-third the diameter of the gear 22 these pinions will rotate three to one, imparting the same speed to their companion gears 32 33 which being the same diameter as the gear 20 will correspond with its speed. Thus the planet gears idly rotate on their axis supported by the planet arms 25 to 27 and cause no movement of the driven shaft H. Thus the positions of the friction wheels as shown in solid lines in Fig. 1 may be said to be in neutral.

Now if the friction wheels are drawn inward on the shafts to the positions shown in dotted lines at 36 37 where the disk diameter equals the diameter of the wheels the speed will be one to one. Thus the gear 20 upon the sleeve will rotate with the gear 22 upon the drive shaft, while the planet gears remain stationary upon their axis merely acting to lock together the gears 20 and 22, while the whole planet set revolve together carrying the shaft H with them at the same speed as the drive shaft. This I term high gear or equal speed.

The operation of increasing from neutral up to high speed then to direct drive is as follows:

With the friction wheels in neutral position 11 12 and the drive shaft F rotating as hereinbefore described, by turning the crank 38 and sleeve 39, Fig. 2, upon the stud 40 I rotate the gear 17 which engages the racks 15 16 thereby slowly drawing the friction wheels toward the center of the disk. Thus the speeds of the friction wheels decrease allowing the planet gears in the rotation upon their axis and planetary revolution around the main axis to gradually decrease the difference in speed between the gears 20 and 22 until equal speed is reached and the friction wheels are at 36 37. Then by pressing down on the crank the yoke 41 will depress and operate the toggle levers 42 to throw the interlocking clutch 43 into the notch 44 of the planet arm 29, thus locking together the entire set of planet gears including the drive and driven shafts. Meantime the depression of the yoke 41 also operates the toggle levers 45 and through them the shift lever 46 which through the plate 47 and ball bearings 48 move the disk against the springs 2 3 and away from the friction wheels. The different speeds having been made equal before throwing in the clutch all shock is obviated.

To reverse the direction of the driven shaft the friction wheels are moved from neutral toward the periphery of the disk or positions 49 50, thereby causing the gear 20 to rotate at a greater speed than the gear 22 and the planet gears to creep backward turning the planet arms and the driven shaft in reverse rotation.

Figure 5:
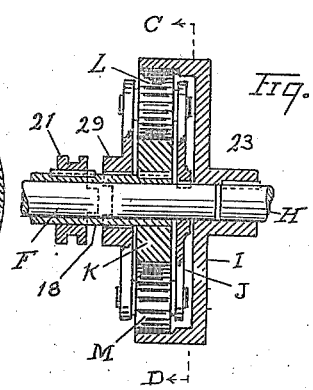

I have described the preferred form of planet gearing as shown in Figs. 1 and 2. In Figs. 4 and 5 I have shown a modification of these gears with an internal gear I fixed to the driven shaft, the planet arm J fixed to the drive shaft and the gear K to the sleeve, the internal gear engaging the outer face of the planet gears L M and the gear K the inner face. The function of this gearing is the same as that shown in Fig. 1.

Having thus fully described my invention what I claim as new and desire to secure by Letters Patent is—

1. In a variable speed transmission, two routes of transmission, one route consisting of a drive shaft, a disk thereon, splined shafts having friction wheels, said wheels engaging said disk, bevel gears fixed to said splined shafts, a sleeve loosely mounted on said drive shaft and having a third bevel gear fixed to one end thereof and in engagement with said first mentioned bevel gears, and a gear fixed to the other end of said sleeve; the other route consisting of an elongation of said drive shaft beyond said sleeve, a gear fixed upon said elongated shaft adjacent to the gear upon said other end of the sleeve, and planet gears connecting the two routes by means of said gear on the elongated shaft and said gear on the other end of the sleeve.

2. In a variable speed transmission, a drive shaft, a fly-wheel thereon, a disk yieldingly mounted upon said fly-wheel, shafts mounted parallel with the face of the disk, friction wheels and bevel gears on the shafts, a sleeve on said drive shaft, a bevel gear on one end of the sleeve, a spur gear on the other end, a spur gear on the drive shaft beyond the end of said sleeve, a driven shaft loosely abutting the end of said drive shaft, a planet arm on said driven shaft, a similar arm spaced apart from said first mentioned arm, planet gears and pinions mounted between said arms and in engagement with the spur gears on said sleeve and said drive shaft, and means for varying the positions of said friction wheels to impart a variable rotation to said driven shaft.

3. In a variable speed transmission, two routes of power transmission, one route consisting of a driver shaft, a gear on said shaft near the end thereof, a driven shaft loosely abutting said end of said driver shaft, a planet arm on said abutting end of said driven shaft, and planet gears mounted on said arm and registering with the gear on said driver shaft; the other route consisting of said driver shaft, a disk thereon at a distance from said driven shaft, shafts parallel to the face of the disk, friction wheels and bevel gears on said shafts, a sleeve on said driver shaft between the disk and said planet arm, a bevel gear on one end of said sleeve and a spur gear on the other end adjacent to said spur gear near the end of said driver shaft, said spur gear on said sleeve registering with the aforementioned planet gears to cause connection between said two routes, and means for varying the speed of the friction wheels.

4. In a variable speed transmission, a drive shaft, a disk thereon, splined shafts having friction wheels mounted along the face of and engaging said disk, bevel gears on said splined shafts, a sleeve on said drive shaft having a bevel and spur gear, said bevel gear engaging the gears on said splined shafts, a planet arm loosely mounted on said sleeve, a driven shaft abutting said drive shaft, a planet arm on said driven shaft; a gear on said drive shaft adjacent to said arm on the driven shaft, planet gears mounted between and upon said arms and in engagement with said spur gear on the sleeve and said gear on the drive shaft, a clutch member splined to said sleeve, a second member integral with said loosely mounted planet arm to engage said clutch member, means for operating said clutch member, means for varying the positions of said friction wheels and means for disengaging said disk from the friction wheels.

NICHOLAS H. E. CLARK.